United States Patent
Son

(10) Patent No.: US 7,976,055 B2
(45) Date of Patent: Jul. 12, 2011

(54) CURTAIN AIRBAG MODULE

(75) Inventor: Yu Ji Son, Busan (KR)

(73) Assignees: Hyundai Motors Company, Seoul (KR); Kia Motors Corporation, Seoul (KR)

(*) Notice: Subject to any disclaimer, the term of this patent is extended or adjusted under 35 U.S.C. 154(b) by 104 days.

(21) Appl. No.: 12/487,224

(22) Filed: Jun. 18, 2009

(65) Prior Publication Data

US 2010/0127484 A1     May 27, 2010

(30) Foreign Application Priority Data

Nov. 27, 2008   (KR) ................. 10-2008-0118947

(51) Int. Cl.
*B60R 21/213*   (2006.01)
*B60R 21/214*   (2006.01)
*B60R 21/201*   (2006.01)
*B60R 21/232*   (2006.01)
*B60R 21/2334*  (2006.01)

(52) U.S. Cl. .................... 280/728.2; 280/730.2
(58) Field of Classification Search ............... 280/728.2, 280/730.2
See application file for complete search history.

(56) References Cited

U.S. PATENT DOCUMENTS

2005/0029780 A1*  2/2005  Tanase ............... 280/730.2
2007/0090634 A1*  4/2007  Jang et al. ........... 280/730.2
* cited by examiner

*Primary Examiner* — Faye M. Fleming
*Assistant Examiner* — Keith Frisby
(74) *Attorney, Agent, or Firm* — Morgan, Lewis & Bockius LLP

(57) ABSTRACT

A curtain airbag module may include an inflator provided above an upper end portion of a B-pillar, a mounting bracket for mounting the inflator, an airbag disposed along a roof side rail under the inflator and connected at a central portion thereof to the inflator, a guide ramp disposed around an upper end portion of a B-pillar trim and holding the airbag therein, thus allowing the airbag to be deployed without being interfered with by the B-pillar trim, and a mounting flap connecting the mounting bracket and the guide ramp.

9 Claims, 4 Drawing Sheets

CURTAIN AIRBAG MODULE

CROSS-REFERENCE TO RELATED APPLICATIONS

The present application claims priority to Korean Patent Application Number 10-2008-0118947 filed Nov. 27, 2008, the entire contents of which application is incorporated herein for all purpose by this reference.

BACKGROUND OF THE INVENTION

1. Field of the Invention

The present invention relates generally to a curtain airbag module and, more particularly, to a curtain airbag module whose inflator is installed near a center pillar.

2. Description of the Related Art

Generally, a curtain airbag which is deployed to cover a side window in the event of a vehicle collision is combined with an inflator for the deployment of the curtain airbag to form a module and then is installed to the roof side rail of a vehicle.

The curtain airbag is provided along the roof side rail in such a way as to extend from an A-pillar through a B-pillar to a C-pillar. During the deployment of the curtain airbag, it is caught by the upper end portion of a B-pillar trim, so that the deployment is delayed or defective deployment frequently occurs. Thus, a guide ramp is installed around the upper end portion of the B-pillar trim so as to prevent the defective deployment of the curtain airbag.

Meanwhile, in the related art, the inflator is installed to the rear end of the curtain airbag, that is, the C-pillar side. Thus, the rear end of the curtain airbag is deployed first by gas pressure from the inflator, and the central portion and the front end are sequentially deployed. However, the whole airbag needs to be deployed simultaneously for protection of passengers and for maintaining constant performance of the curtain airbag module.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an improved curtain airbag module, which is constructed to enable rapid simultaneous deployment of the whole airbag, and which ensures the smooth deployment of the curtain airbag around a B-pillar.

In an aspect of the present invention, a curtain airbag module, may include an inflator provided above an upper end portion of a B-pillar, a mounting bracket for mounting the inflator, an airbag disposed along a roof side rail under the inflator and connected at a central portion thereof to the inflator, a guide ramp disposed around an upper end portion of a B-pillar trim and holding the airbag therein, thus allowing the airbag to be deployed without being interfered with by the B-pillar trim, and a mounting flap connecting the mounting bracket and the guide ramp.

The mounting bracket may be coupled to the roof side rail. The guide ramp may be coupled to the B-pillar. The guide ramp may be configured to face a lower end portion of the head lining. The guide ramp may include on a front thereof a U-shaped opening and twofold bottom portion which has a hollow structure. The mounting flap may extend to pass through the guide ramp, and the guide ramp holding the airbag is hung on the mounting bracket by the mounting flap.

The mounting bracket may be provided with a protruding hook and an upper end portion of the mounting flap is secured to the hook.

In another aspect of the present invention, the mounting bracket may include a first fixing portion at which the inflator is fixed and a second fixing portion coupled to the first fixing portion and extending a predetermined length so as to be coupled to the roof side rail such that the inflator is spaced apart from the roof side rail, wherein the first fixing portion is provided with a protruding hook and an upper end portion of the mounting flap is secured to the hook In further another aspect of the present invention, the curtain airbag module may include a plurality of the first and second fixing portions and respective sets of the first and second fixing portions are spaced apart from each other in a transverse direction of a vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
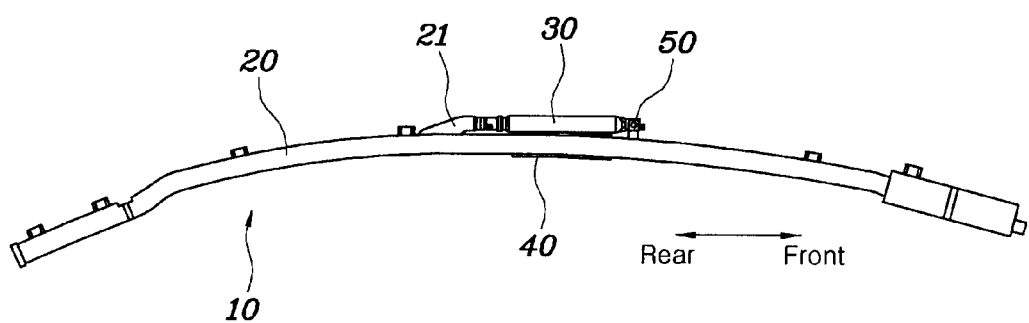
FIG. 1 is a front view illustrating a curtain airbag module according to an exemplary embodiment of the present invention.

Referring to FIG. 1, the curtain airbag module 10 according to various embodiments includes an inflator 30 which is placed on the central portion of a curtain airbag 20 extending along the roof side rail 4 of a vehicle (see FIG. 3), and is constructed so that gas flows from the inflator 30 through a coupling part 21 to the curtain airbag 20. At first, the inflow gas inflates the central portion of the curtain airbag 20. Subsequently, the front and rear ends are almost simultaneously inflated.

Figure 2:
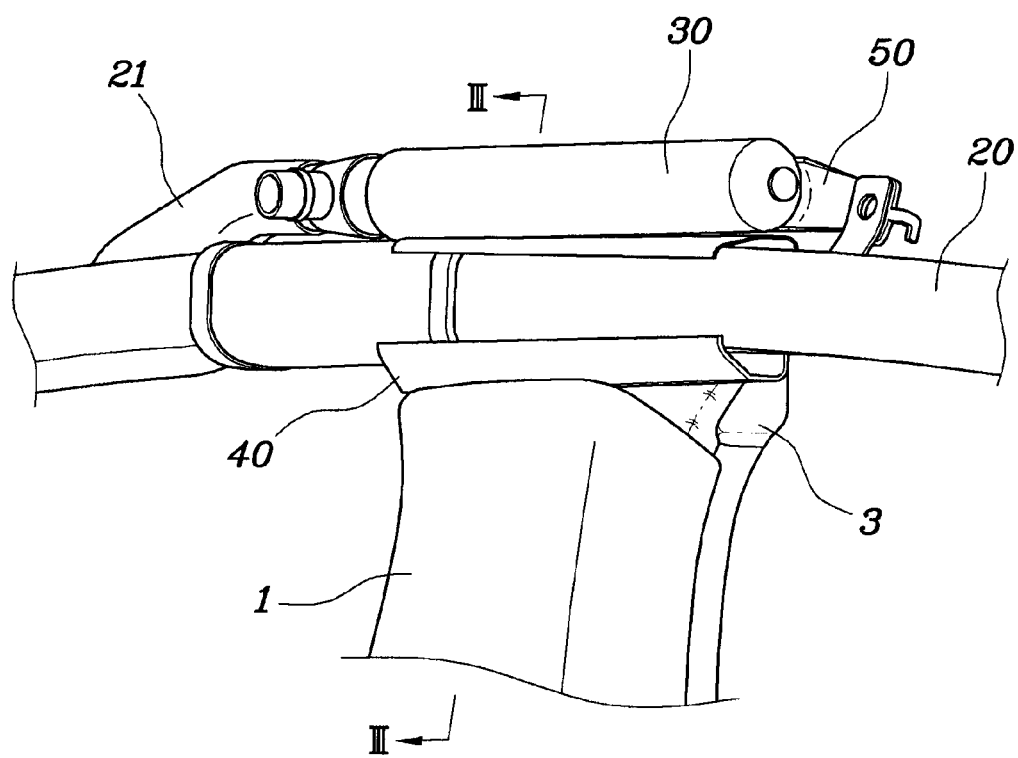
FIG. 2 is a view illustrating the state in which the curtain airbag module of FIG. 1 is mounted to a vehicle.
Figure 3:
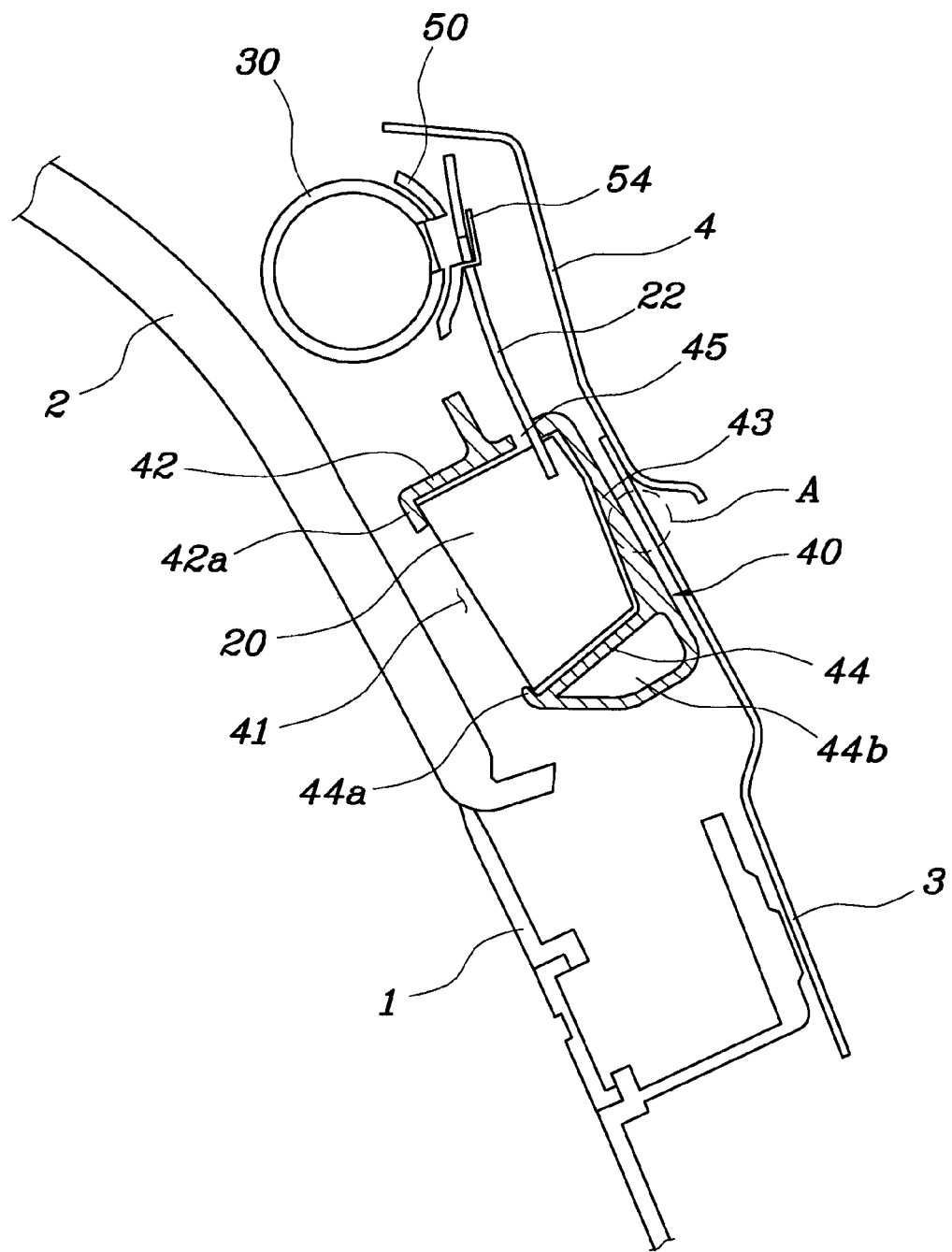
FIG. 3 is a sectional view taken along line III-III of FIG. 2.

Referring to FIGS. 2 and 3, the inflator 30 is provided above the upper end portion of a B-pillar 3 (concretely, a center inner panel) in such a way as to be placed in the longitudinal direction of the vehicle, and is mounted to a vehicle body (mainly, the roof side rail denoted by reference numeral 4 in FIG. 3) by mounting brackets 50. The curtain airbag 20 is placed under the inflator 30, and the central portion of the curtain airbag 20 is held by a guide ramp 40 which is disposed around the upper end portion of a B-pillar trim 1. FIG. 2 omits a head lining 2 so as to show the curtain airbag module 10.

Figure 4:
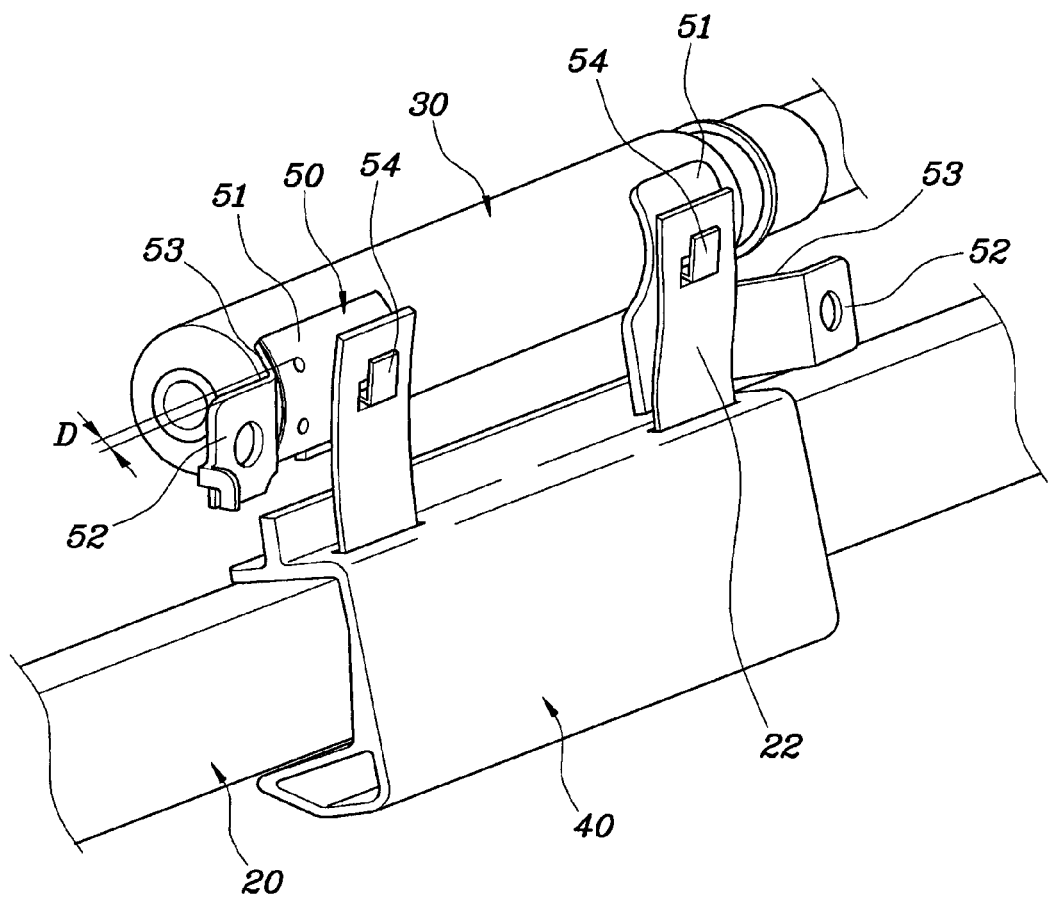
FIG. 4 is a rear view illustrating the important parts of the curtain airbag module of FIG. 1.

The guide ramp 40 holds the curtain airbag 20 so that the curtain airbag 20 is smoothly deployed to the interior of a vehicle without being interfered with by the upper end portion of the B-pillar trim 1. To this end, it is necessary to secure or support the guide ramp 40 to the vehicle body. Referring to FIGS. 3 and 4, the guide ramp 40 is not directly secured to the vehicle body, but is hung on the mounting brackets 50 using the mounting flaps 22 of the curtain airbag 20. In detail, the mounting flaps 22 may pass through the guide ramp 40 which surrounds the central portion of the curtain airbag 20, and are held at upper end portions thereof to the hooks 54 of the mounting brackets 50.

In the support structure for the guide ramp 40, the guide ramp 40 is placed to be nearer to the head lining 2 than to the vehicle body. Thus, in the initial step of the deployment, the curtain airbag 20 rapidly pushes and opens the lower end of the head lining 2 without being interfered with by the B-pillar trim 1, while being more smoothly deployed to the interior of the vehicle. Further, after the inflator 30 and the mounting brackets 50 are secured to the vehicle body, the mounting flaps 22 are fitted over the hooks 54, so that the curtain airbag module 10 is assembled with the vehicle body, and thus the assembly is convenient. Meanwhile, a hole may be formed in a portion denoted by 'A' in FIG. 3 and the guide ramp 40 is temporarily held on the vehicle body through the hole, so that the position of the guide ramp 40 in the transverse direction of the vehicle is controlled. The mounting flaps 22 control the position (i.e. placed height) of the guide ramp 40 in a vertical direction.

Further, in various embodiments, the present invention may include a plurality of mounting brackets aligned in the transverse direction of the vehicle. Referring to FIGS. 3 and 4, the mounting brackets 50 are provided on the opposite ends of the back surface of the inflator 30. In each mounting bracket 50, a first fixing portion 51 at which the inflator 30 is mounted to the mounting bracket 50 and a second fixing portion 52 at which the mounting bracket 50 is mounted to the vehicle body are not at the same position but are spaced apart from each other by an interval "D". That is, the second fixing portion 52 extends from the first fixing portion 51 with a bent part 53 or step provided between the first and second fixing portions 51 and 52. The bent part 53 causes the inflator 30 to be spaced apart from the vehicle body to some extent, thus preventing the inflator 30 from being directly hit in the event of a vehicle collision. Meanwhile, each hook 54 is provided on the first fixing portion 51, so that the guide ramp 40 is placed nearer to the head lining 2 in the transverse of the vehicle, and thus the curtain airbag 20 can be deployed more rapidly and smoothly.

Figure 5:
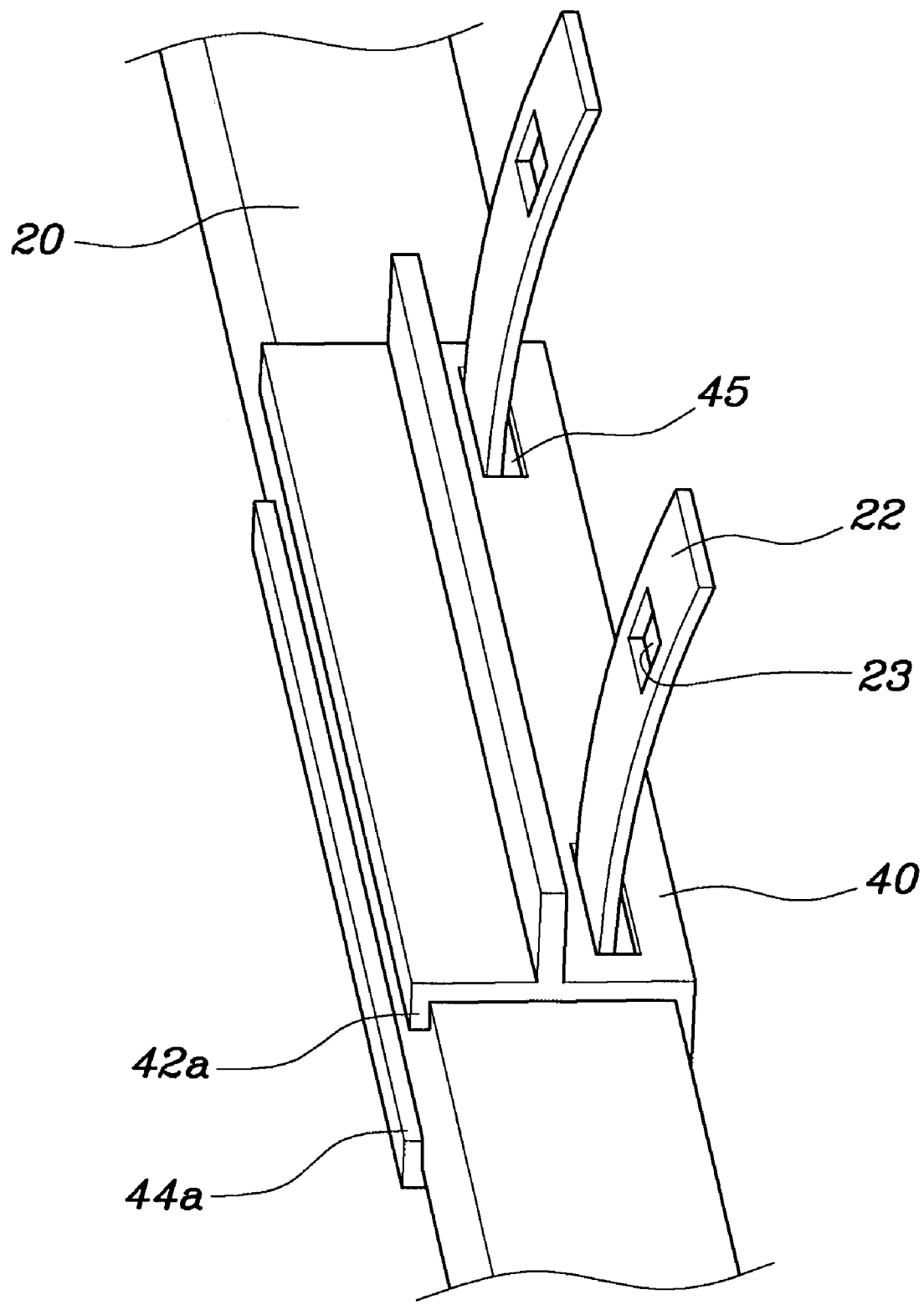
FIG. 5 is a plan view illustrating the curtain airbag module (excluding the inflator) of FIG. 4.

Referring to FIGS. 3 and 5, the guide ramp 40 has on a front thereof an opening 41, and includes a top 42, a back 43 and a bottom 44, so that its entire shape is similar to a "U" shape. A slit 45 is provided in the top 42. Each mounting flap 22 having at its upper end portion a hole 23 which is fitted over the hook 54 protrudes upwards through the slit 45. The bottom 44 has a twofold structure which has a hollow portion 44b therein. Protrusions 42a and 44a are provided, respectively, on the ends of the top 42 and bottom 44 adjacent to the opening 41 so as to prevent the curtain airbag 20 from being removed from the guide ramp 40. Meanwhile, although not shown in the drawings, as well known to those skilled in the art, the curtain airbag 20 may be enclosed with a cover or wrapped with a band so as to maintain the folded state.

As described above, the present invention provides a curtain airbag module, which is constructed so that gas pressure is transmitted from an inflator to the central portion of a curtain airbag, thus allowing the front end and the rear end, and the whole of the curtain airbag to be deployed simultaneously.

Further, the present invention provides a curtain airbag module, which has a guide ramp holding a curtain airbag around the upper end portion of a B-pillar trim, thus allowing the curtain airbag to be smoothly deployed through a gap between the B-pillar trim and a head lining.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A curtain airbag module, comprising:
   an inflator provided above an upper end portion of a B-pillar;
   a mounting bracket for mounting the inflator;
   an airbag disposed along a roof side rail under the inflator and connected at a central portion thereof to the inflator;
   a guide ramp disposed around an upper end portion of a B-pillar trim and holding the airbag therein, thus allowing the airbag to be deployed without being interfered with by the B-pillar trim; and
   a mounting flap connecting the mounting bracket and the guide ramp,
   wherein the mounting flap extends to pass through the guide ramp, and the guide ramp holding the airbag is hung on the mounting bracket by the mounting flap.

2. The curtain airbag module as set forth in claim 1, wherein the mounting bracket is coupled to the roof side rail.

3. The curtain airbag module as set forth in claim 1, wherein the guide ramp is coupled to the B-pillar.

4. The curtain airbag module as set forth in claim 1, wherein the guide ramp is configured to face a lower end portion of a head lining.

5. The curtain airbag module as set forth in claim 1, wherein the guide ramp includes on a front thereof a U-shaped opening and twofold bottom portion which has a hollow structure.

6. The curtain airbag module as set forth in claim 1, wherein the mounting bracket is provided with a protruding hook and an upper end portion of the mounting flap is secured to the hook.

7. The curtain airbag module as set forth in claim 1, wherein the mounting bracket includes a first fixing portion at which the inflator is fixed and a second fixing portion coupled to the first fixing portion and extending a predetermined length so as to be coupled to the roof side rail such that the inflator is spaced apart from the roof side rail.

8. The curtain airbag module as set forth in claim 7, wherein the first fixing portion is provided with a protruding hook and an upper end portion of the mounting flap is secured to the hook 9. The curtain airbag module as set forth in claim 7, wherein the curtain airbag module comprises a plurality of the first and second fixing portions and respective sets of the first and second fixing portions are spaced apart from each other in a longitudinal direction of a vehicle.

* * * * *